(12) United States Patent
Prasad et al.

(10) Patent No.: US 7,391,786 B1
(45) Date of Patent: Jun. 24, 2008

(54) CENTRALIZED MEMORY BASED PACKET SWITCHING SYSTEM AND METHOD

(75) Inventors: Sharat Prasad, San Jose, CA (US); Terry Seaver, Pleasanton, CA (US); Yanfeng Wang, Santa Clara, CA (US); Yu Deng, Milpitas, CA (US); Luis M. Hernandez, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 995 days.

(21) Appl. No.: 10/305,639

(22) Filed: Nov. 27, 2002

(51) Int. Cl.
*H04L 12/28* (2006.01)
*H04L 12/54* (2006.01)

(52) U.S. Cl. ........................ 370/412; 370/429

(58) Field of Classification Search ................ 370/389, 370/401, 412–418, 429
See application file for complete search history.

(56) References Cited

U.S. PATENT DOCUMENTS

| | | | | |
|---|---|---|---|---|
| 5,268,900 A * | 12/1993 | Hluchyj et al. | ............. | 370/429 |
| 5,689,500 A * | 11/1997 | Chiussi et al. | ............. | 370/235 |
| 5,689,506 A * | 11/1997 | Chiussi et al. | ............. | 370/388 |
| 5,790,522 A * | 8/1998 | Fichou et al. | ............. | 370/236 |
| 5,859,980 A * | 1/1999 | Kalkunte | .................... | 709/232 |
| 5,996,019 A * | 11/1999 | Hauser et al. | ............. | 709/235 |
| 6,098,109 A * | 8/2000 | Kotzur et al. | ............. | 709/249 |
| 6,351,466 B1 * | 2/2002 | Prabhakar et al. | ........... | 370/413 |
| 6,542,507 B1 * | 4/2003 | Khacherian et al. | .... | 370/395.43 |
| 6,657,955 B1 * | 12/2003 | Bonneau et al. | ............. | 370/229 |
| 6,721,273 B1 * | 4/2004 | Lyon | .......................... | 370/235 |
| 6,959,002 B2 * | 10/2005 | Wynne et al. | ............... | 370/412 |
| 6,999,453 B1 * | 2/2006 | Chemla et al. | .............. | 370/389 |
| 7,016,367 B1 * | 3/2006 | Dyckerhoff et al. | ........ | 370/429 |
| 7,046,687 B1 * | 5/2006 | Brown et al. | ................. | 370/412 |
| 7,088,710 B1 * | 8/2006 | Johnson et al. | ............. | 370/357 |
| 7,103,056 B2 * | 9/2006 | Chao et al. | .................. | 370/417 |
| 2002/0048280 A1 * | 4/2002 | Lee et al. | .................... | 370/468 |
| 2002/0061028 A1 * | 5/2002 | Chao et al. | .................. | 370/417 |
| 2002/0141427 A1 * | 10/2002 | McAlpine | .................... | 370/413 |
| 2003/0021266 A1 * | 1/2003 | Oki et al. | ..................... | 370/388 |
| 2003/0058880 A1 * | 3/2003 | Sarkinen et al. | ............. | 370/413 |
| 2003/0165151 A1 * | 9/2003 | Chao et al. | .................. | 370/416 |
| 2004/0081184 A1 * | 4/2004 | Magil et al. | ................. | 370/413 |
| 2004/0120324 A1 * | 6/2004 | Hughes et al. | ........... | 370/395.6 |

OTHER PUBLICATIONS

Chuang, Shang-Tse et al., "Matching Output Queueing With a Combined Input Output Queued Switch", pp. 1-17, 1999.
Prabhakar, Balaji et al., "On the Speedup Required for Combined Input and Output Queued Switching", pp. 1-13, Sep. 1999.

* cited by examiner

*Primary Examiner*—Wing F. Chan
*Assistant Examiner*—Hong Sol Cho
(74) *Attorney, Agent, or Firm*—Cindy Kaplan

(57) ABSTRACT

A packet switching system and method are disclosed. The system includes a plurality of input and output ports and an input buffer at each of the input ports. The system further includes an input scheduler associated with each of the input buffers and a centralized memory shared by the output ports. An output buffer is located at each of the output ports and an output scheduler is associated with each of the output ports. Each of the input buffers comprises a plurality of virtual output queues configured to store a plurality of packets in a packed arrangement.

21 Claims, 8 Drawing Sheets

CENTRALIZED MEMORY BASED PACKET SWITCHING SYSTEM AND METHOD

BACKGROUND OF THE INVENTION

The present invention relates generally to data communications systems, and more specifically, to a centralized memory based packet switching system and method.

The interconnection of networks relies on implementation of real-time packet switching fabrics. Switches are used to route arriving packets on the basis of information contained in each packet header. The switch functions to route packets to their correct destination port and resolve conflicts when several simultaneously arriving packets are headed to a common output port. Queuing is required to prevent packets from being lost whenever another packet simultaneously arrives on a different input and is bound for the same output.

A switch may employ input buffers and/or output buffers. Input buffers connect to input lines and output buffers connect to output lines. A fabric interconnects the input and output buffers. The fabric itself may be buffered or buffer-less. A buffer-less fabric does not have buffers to store excess cells and requires a central scheduler to ensure that no two inputs each forward a cell that is destined to the same output.

A buffered fabric does not require a central scheduler. When two or more inputs each forward a packet that are all destined for the same output, the fabric can forward one of the packets and store the others. If the buffered fabric has sufficient buffering and the data rates of its interfaces match the data rate of the lines, no input (or negligible input) or output buffering may be needed. A switch with such a fabric is referred to as a shared buffer switch. If a buffered fabric has limited buffering and the buffer is almost full, the fabric can backpressure some of the input buffers. The back-pressured input buffers do not forward any packet until the fabric deactivates the backpressure.

Within any buffer, the waiting packets may be arranged into one queue or more than one queue. The packets are arranged into more than one queue so that packets in different queues can be given separate forwarding treatment or so that the packets do not interfere with forwarding of each other. An example of the former is input queuing. Input queuing uses different queues for different priorities maintained within the input buffer at an input line. An example of the latter, discussed in detail below, is virtual output queuing. Virtual output queuing uses different queues for different outputs maintained within the input buffer at an input line.

Input queuing is more frequently used since it does not require high memory bandwidth, regardless of the number of input ports in the design. Packets arriving at the input ports 10 (1-N) are placed into buffers prior to placement on the correct output lines (1-N) at a crossbar 16 (FIG. 1). If the input and output lines are running at rate R, a bandwidth of only 2R is required of the buffers. In any given time slot, leading packets in all of the buffers are sent to their respective desired output lines. If several packets contend for the same output, only one of them is selected according to a scheduler 14 algorithm, and the rest remain in the buffers and contend again in the next time slot.

Input queuing has a number of drawbacks. One is that this architecture suffers from head-of-line blocking. This occurs when a packet in a queue is denied access to its output line, even though there are no other cells requiring the same output line, because the packet in the head of that queue was blocked in contention for a different output. If the desired output line of the packet at the head of the queue is under heavy contention, other packets in that queue may have to wait and the desired output of the latter packets may go idle. Input queuing thus suffers from low permitted input load.

The head-of-line blocking effect may be mitigated by Virtual output queuing (i.e., maintaining a separate queue for each output at each input). A drawback of virtual output queuing is that it requires a very complicated scheduler to find maximum input-output matching in order to achieve maximum throughput. The most popular scheduling algorithms either require multiple iterations (which is impractical in high capacity switches due to the small amount of time available) to find maximum matching or find a sub-optimal matching. However, there is no guarantee of one hundred percent throughput in the sub-optimal matching case.

Even though high throughput can be achieved for input queued switches by using a combination of virtual output queuing and complex scheduling, packets experience larger delays and delay variation in input queued switches than in output queued switches due to the input contention phenomenon. As an input can only deliver one cell to the fabric each cell time, a cell at an input for an output contends with cells at the same input for different outputs. Even if a cell is at the head of a virtual output queue at an input, the input may chose to forward a cell from a different virtual output queue. In comparison, packets in an output queued switch only contend with other packets destined to the same output.

The problem of realizing delay and delay variation with virtual output queuing that are comparable to those with output queuing is well studied. A test of the effectiveness of any switch to provide throughput, stability, latency and latency variation comparable to an output queuing switch is whether the departing packet streams from the test switch are the same as those from the output queuing switch given that the arriving packet streams are the same.

It has been found that in case of virtual output queues and a buffer-less fabric, speed-up is required. In particular a speed-up equal to smaller of four or number of ports is required with conventional queue management (see, Balaji Prabhakar and Nick McKeown, "On the Speedup Required for Combined Input and Output Queued Switching," Automatica, Vol. 35, no. 12, Dec. 1999). A speed-up of two suffices if queue management permits packets to be inserted into the correct place in a queue of packets ordered according to their departure times or packet with the earliest departure time to be removed irrespective of their place in the queue of packets ordered according to their arrival times (see, Shang-Tse Chuang, et al. "Matching Output Queueing with a Combined Input Output Queued Switch," IEEE Journal on Selected Areas in Communications, vol. 17, n.6, Dec. 1999, pp. 1030-1039).

The presence of a speed-up makes any switch an Input Output Buffered (IOB) switch rather than simple input buffered switch. As any output of a fabric with speed-up can deliver more than one cell per cell time and the corresponding output line only forward one cell per cell time, output buffers are required. If speed-up is equal to N, no input buffers and only output buffers are needed. For speed-up less than N but greater than 1, both input and output buffers are needed. It can be shown that if the worst-case size of the buffer in a shared buffer switch is B, the same of an input buffered switch (speed-up=1) is B, of an input output buffered switch with a speed-up of N/2 is 1.5B and of an Output Buffered switch (speed-up=N) is 2B.

Output-queued switch designs require high memory bandwidth (FIG. 2). For an N×N switch (i.e., N-input, N-output) with data rate R (data arrival rate at each input port is R bytes per clock cycle), (N+1)R memory bandwidth is required for each individual output queue memory, or 2NR for centralized shared memory. Hence, while the output queues in shared buffer architecture has the smallest delay, delay variation and memory requirement, it has the highest memory bandwidth requirement.

There are a number of considerations that limit the memory bandwidth that can be achieved. The primary consideration is the frequency (f) of operation of the interface. Higher frequency of operation is possible for embedded memories than for external memories. Currently, 625 MHz operation is possible for embedded memories.

If the memory cell size is w bytes and w is g times (g>1) the size P of the smallest packet, for a stream of all minimum sized packets, the efficiency of the interface will be 1/g<1. Furthermore, if w=gP is the memory cell size, all packets may be of size (gP+1) bytes, require two cells per packet, and the efficiency of interface will be (gP+8)/2gP. Hence the worst-case bandwidth of a buffer with memory cell size of gP bytes interface running at f cells per second will only be b=(fgP min[1/g, (gP+8)/2gP]) bytes/second. It is easy to see that b attains its maximum value for g=2. Hence the maximum useful packet buffer memory bandwidth that can be realized is fP.

For Ethernet, the minimum packet interval is P=512 bits. Thus, currently, the maximum useful packet buffer memory bandwidth that can be realized is 320 Gb/s and requires a 1024-bit interface running at 625 MHz. As an RN b/s switch (N×N switch with lines running at R b/s) requires 2RN b/s of bandwidth into the shared memory, a shared memory switch with a capacity greater than 160 Gb/s cannot be built in a straightforward way.

The reason for the upper bound of fP/2 on the capacity of a shared memory switch is the constraint that each memory cell must contain data from only any one packet. If a memory cell is allowed to contain data from two or more packets, with a cell size of w bytes, fw/2 bytes/second shared memory switch can be built. Capacity of the switch can be scaled by correspondingly scaling w. For example, with the same 1024-bit memory running at 625 MHz, a switch with a capacity of 320 Gb/s can be built. Doubling the width of the memory to 2048-bit doubles the capacity to 640 Gb/s. However, if a memory cell is to contain data from two or more packets, the memory cell cannot be written into the buffer memory as soon as a packet completes. It is necessary to wait until the memory cell is filled before writing it into the memory. Similarly, when a cell is read from the memory to transmit packets, the next cell cannot be read as soon as we complete transmitting a packet. As the cell may contain all or part of the next packet, it is now necessary to wait until the memory cell is emptied before reading the next word. In this way at least one memory cell per queue that is being filled and one cell per queue that is being emptied have to be maintained.

As the memory cells being filled are the tail and similarly the memory cells being emptied are the head of the respective queues, this packet buffer memory management is called Queue Tail and Head Caching or simply Queue Caching (see, U.S. patent application Ser. No. 10/135,495, filed Apr. 30, 2002). Queue Caching introduces its own considerations. First is the need for a mechanism to identify packet boundaries as any memory cell may now contain more than one packet or parts thereof. The second consideration is the amount of memory required for the queue head and tail caches. Each cache typically requires two memory cells; one awaiting a write to or one that has just been read from the main buffer and a second awaiting completion of filling or emptying per queue. As the memory required for the caches is proportional to the number of queues, Queue Caching works best for a reasonable number of queues e.g. per-class queues rather than a large number of queues (e.g., per-flow queues). For example, a 64-port switch that supports four priority classes requires a total of 16 k queues. At 1024-bit cell size, the total amount of memory required for the caches is 2*2*16*1024*1024=64 Mb. This is a non-trivial amount of memory. If each cache entry was one rather than two memory cells, the amount of memory required for the caches would also be half at 32 Mb. Furthermore, if the 64 port switch datapath is sliced equally among four chips, each chip requires 32/4=8 Mb.

Another consideration is the latency to complete the filling of a memory cell. For example, the average rate of total traffic from a port i to another port j may be 10 Mb/s. In order to fill 1024 bits, 102.4 us is required. In the worst-case, a packet for this stream may get delayed by 102.4 us at each hop. The delay may be even larger if the traffic is bursty (i.e., the flow offers data at the rate of 100 Mb/s for 200 ms and then goes off for 1800 ms). A packet at the end of the burst may get delayed by 1800 ms.

A further consideration is the amount of memory for the main buffer. If a burst of size B arrives at each input for output 0, next for output 1, . . . , finally for output (N−1) and then the whole process repeats it self; the main buffer needs to be N(N−1)B/2 to absorb all the bursts. For the switch under consideration with B=80 Mb, this is 39.680 Gb of memory. This is much more memory than what can be integrated on-chip. Even off-chip, cost, space and power constraints will dictate use of DRAM rather than SRAM. Currently, with Trc=20 ns for the low latency DRAMs, 640*10^9*20*10^−9=12800 b per queue or 50 Mb total (for 4096 queues) of on-chip memory is required. At a throughput of 400 Mb/s per pin, 640*10^9/(400*10^6)=1600 pins are required. Finally, with the typical many (e.g., 8) line cards and a redundant pair of switch cards architecture, a maintenance change-over from the working switch card to the protection switch card may result in loss or duplication of all the packets stored in the buffer on the switch card.

From all the considerations set forth above, it is desired to provide only as much buffering in the switch as can be provided on-chip and use the input and/or output buffers. As previously discussed, output buffering requires larger overall memory and also a speed-up in the switch core. Having a speed-up is undesirable as it requires a high bandwidth switch core but offers a smaller revenue generating bandwidth. A solution will preferably combine at least some of the following: input buffering; no central scheduler; no speed-up; an overall memory requirement equal to that of shared buffering; small on-chip buffers in the switch; and small delay and delay variation of output queuing.

Traditional buffer and queue management does not allow packing multiple packets into a single memory cell. This results in two limitations. The first limitation is the efficiency of memory utilization. As the memory cell size is 4NR, then a packet with size (4NR+1) has to occupy two memory cells. Second, the allowed 2NR can be no larger than the minimum packet size in order to sustain throughput.

Due to the complexity of the scheduler design, almost all conventional switch designs require fix-sized data cells being switched. These designs therefore require data packets to be sliced into fix-sized cells before input and reassembled after the output of the switch fabric. This function is usually implemented in separate ASICs and requires an encapsulation header for packet reassembly. Conventional designs also require separate input/output chips. These architectures have to use multiple chips by bit-slicing the data path, separating output contention resolution input or output buffering to a separate chip, or multi-stage interconnection.

SUMMARY OF THE INVENTION

A packet switching system and method are disclosed. The system includes a plurality of input and output ports and an input buffer at each of the input ports. The system further includes an input scheduler associated with each of the input buffers and a centralized memory shared by the output ports. An output buffer is located at each of the output ports and an output scheduler is associated with each of the output ports.

In another aspect of the invention, a method generally comprises receiving packets at an input buffer having a plurality of virtual output queues and selecting, based on the information in the packet header, a virtual output queue for each of the packets. An input scheduler selects a virtual output queue based on backlogged data length in said plurality of virtual output queues. Data is transferred from the virtual output queues to a centralized memory. The method further includes selecting by an output scheduler, data to be transmitted to an output buffer and transmitting one of the packets from the output buffer after all data corresponding to the packet is received.

A computer program product for memory based switching generally comprises code that receives packets at an input buffer having a plurality of virtual output queues and code that selects by an input scheduler, a virtual output queue for each of the packets based on backlogged data length in the plurality of virtual output queues. The product further includes code that transfers data in the virtual output queues to a centralized memory and code that selects by an output scheduler, data to be transmitted to an output buffer. Additional code transmits one of the packets from the output buffer after all data corresponding to the packet is received. A computer-readable storage medium is provided for storing the codes.

The above is a brief description of some deficiencies in the prior art and advantages of the present invention. Other features, advantages, and embodiments of the invention will be apparent to those skilled in the art from the following description, drawings, and claims.

BRIEF DESCRIPTION OF THE DRAWINGS

Corresponding reference characters indicate corresponding parts throughout the several views of the drawings.

DETAILED DESCRIPTION OF THE INVENTION

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

Figure 1:
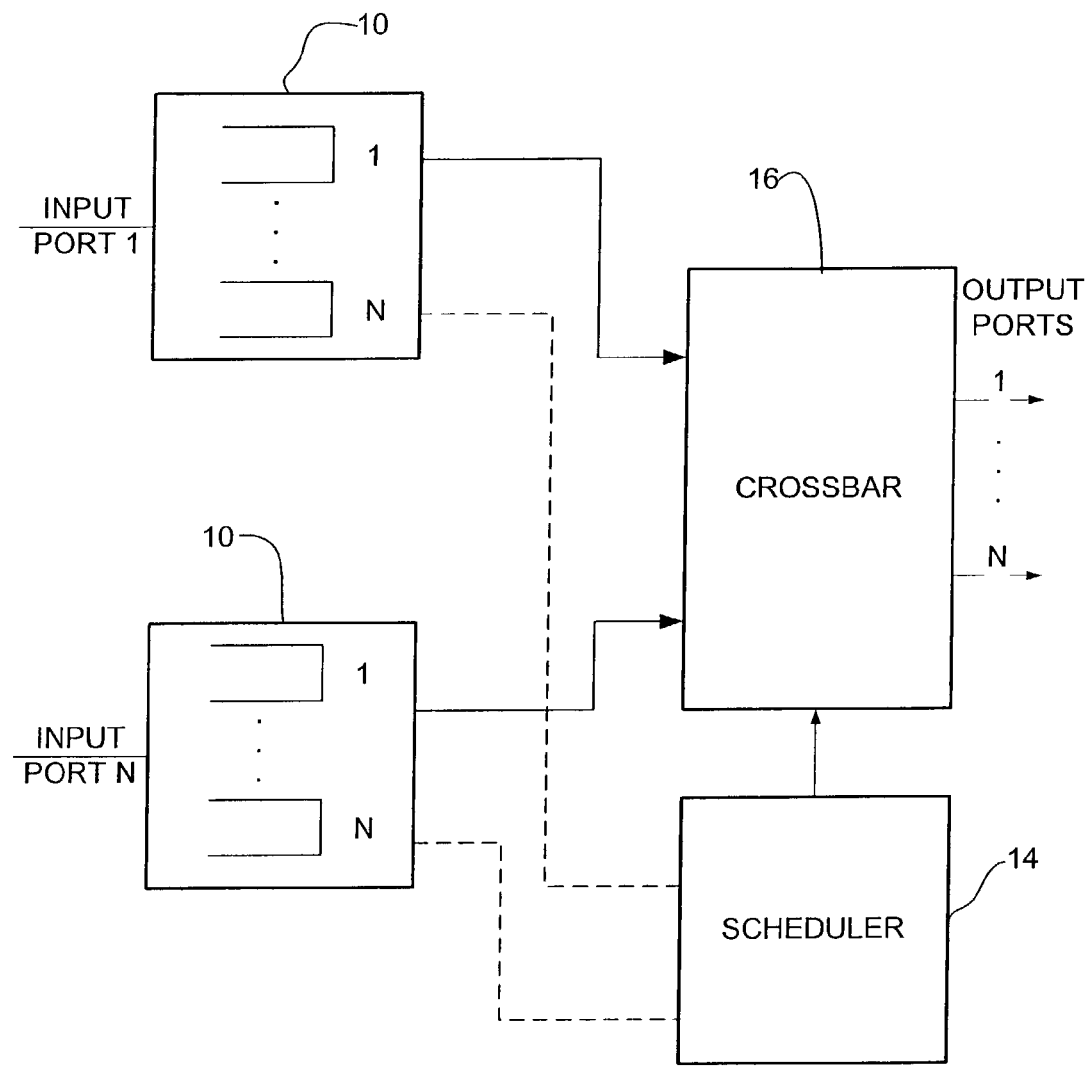
FIG. 1 is a diagram illustrating prior art input queuing.
Figure 2:
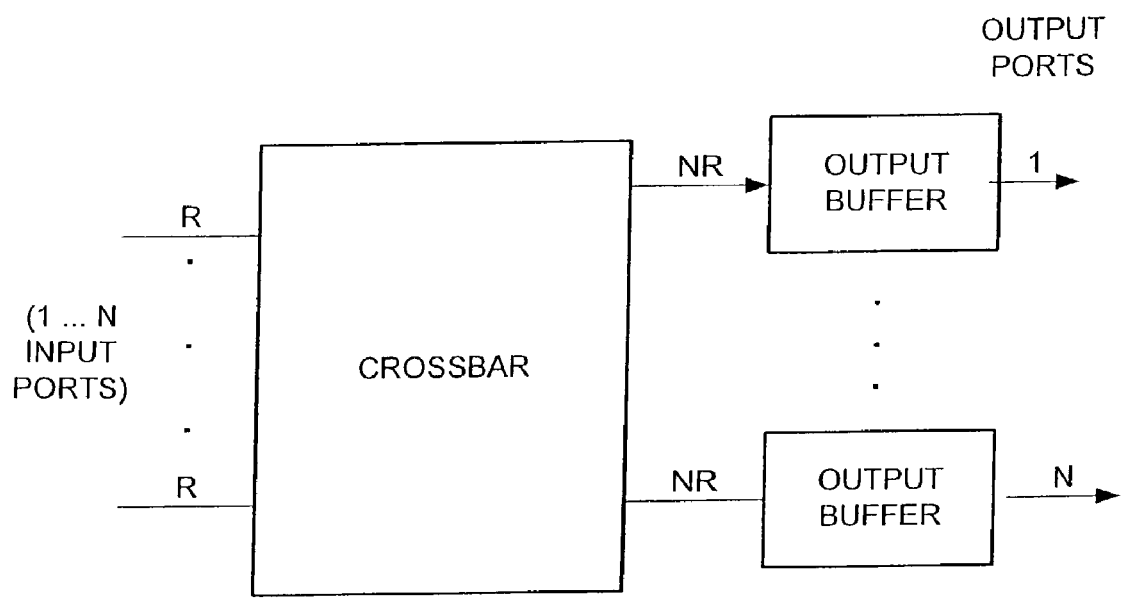
FIG. 2 is a diagram illustrating prior art output queuing.
Figure 3:
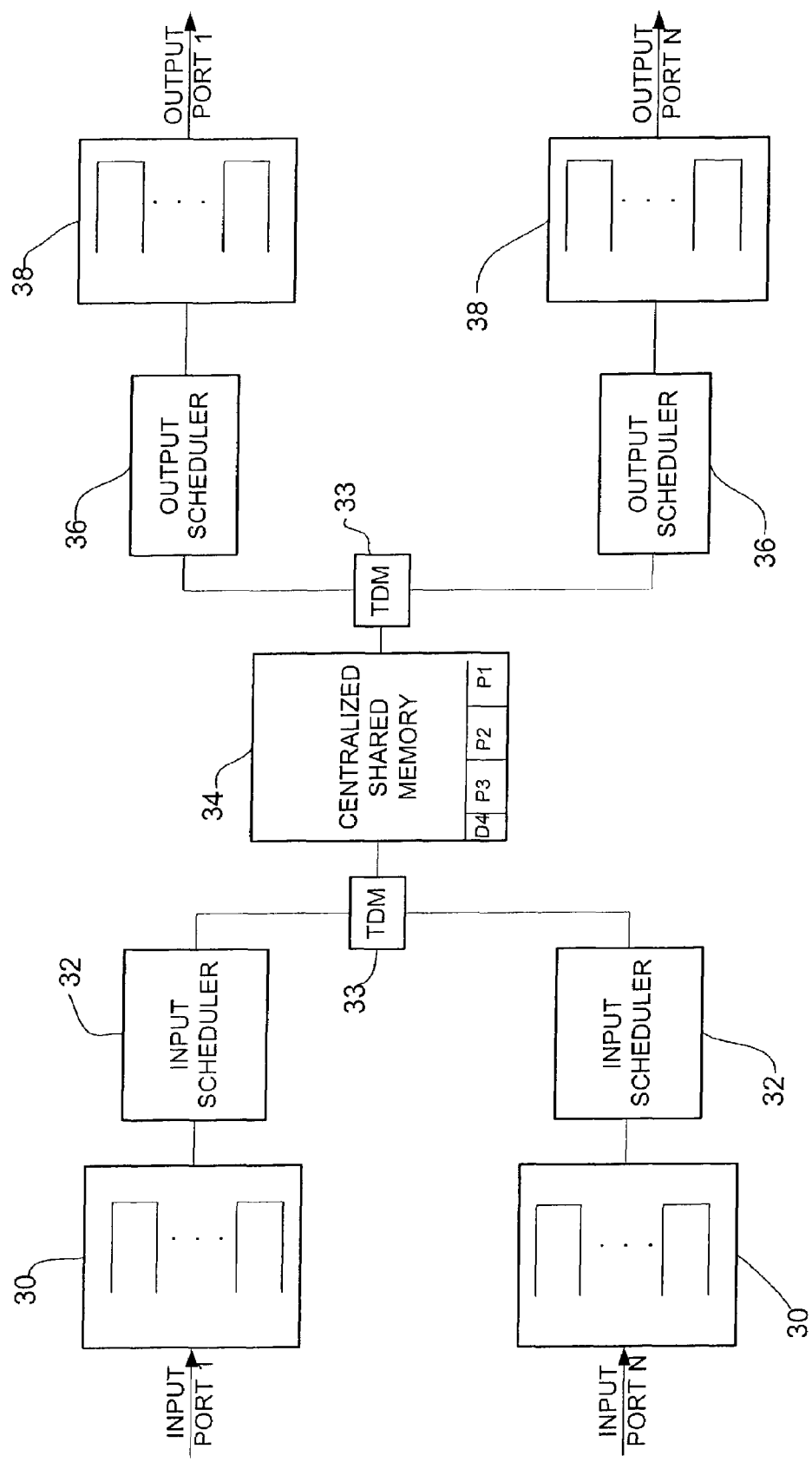
FIG. 3 is a diagram illustrating one embodiment of a system of the present invention.

The present invention operates in the context of a data communication network including multiple nodes. Nodes of a network may be user workstations, servers, routers, etc. Some of the nodes in a network that employs the present invention may be network devices such as routers and switches. The system described herein provides a switching architecture based on a shared memory. The system provides a variable length packet switch with packet interfaces. FIG. 3 illustrates one embodiment of the system of the present invention. The system includes an input buffer 30 and a scheduler 32 for each input port, a shared memory fabric 34, which is shared by all output ports, and an output scheduler 36 and output buffer 38 for each output port. The switch preferably includes N input ports and N output ports.

Figure 4:
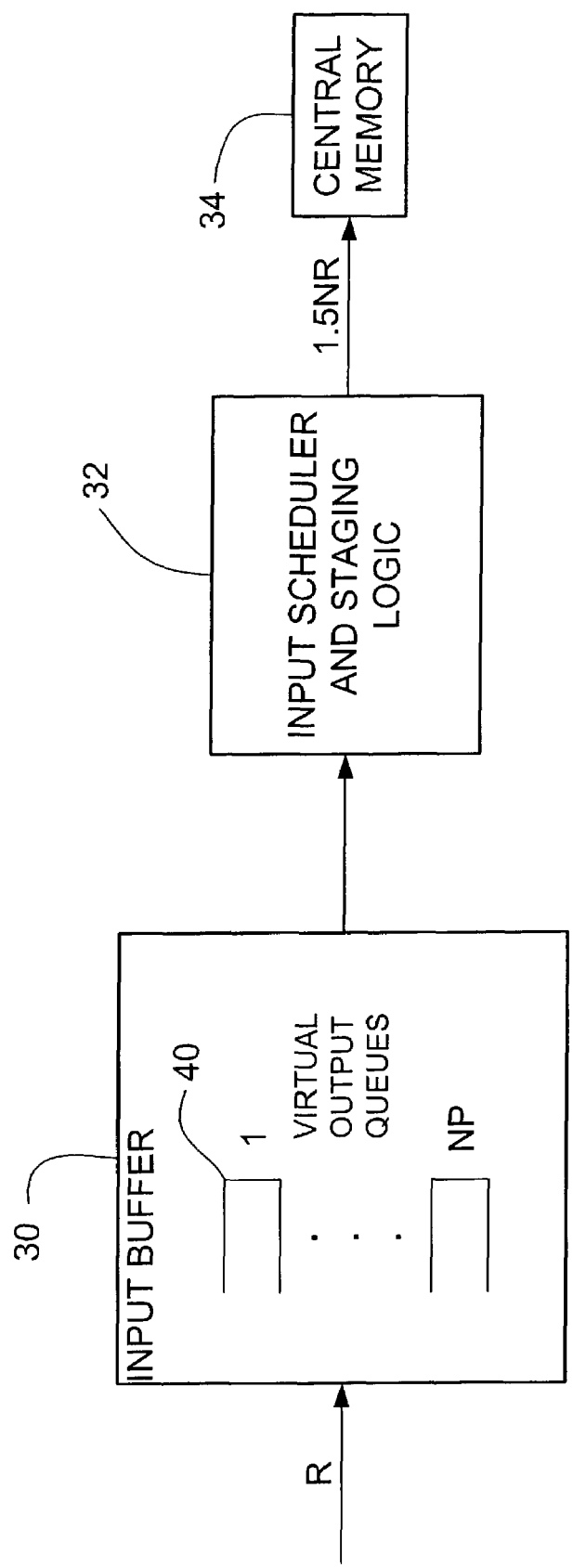
FIG. 4 is a diagram illustrating details of an input port and scheduler of the system of FIG. 3.

FIG. 4 illustrates details of the input port architecture. The data arrival rate at each input port 30 is R. In order to support P levels of priorities, NP virtual output queues (VOQs) 40 are provided at each input port 30 to support strict priority and prevent head-of-queue blocking. Multiple packets are packed together in each buffer 40. This enables the architecture to be scaled in capacity beyond the limit otherwise imposed by the minimum packet size and avoids the factor of two penalty that otherwise applies due to the segmentation of packets into memory cells.

Each input port 30 has its own input scheduler and staging logic 32. The input scheduler 32 selects a virtual output queue 40 mainly based on the data length in the virtual output queues and attempts to maintain average transfer rate R into the central memory 34 when the input link is fully occupied. A small sized packet in a virtual output queue 40 is generally guaranteed to be transferred to the central memory 34 by time out logic and input idle counting logic. This ensures that if the tail of a packet occupies part of a memory cell and the packet is followed by a long idle interval, the packet is not delayed waiting for the memory cell to fill and is forwarded once the time-out occurs. The time-out counter associated with VOQ for output j at input i is configured to count down at a rate no faster than the actual provisioned bandwidth from input i to output j.

The input scheduler and staging logic 32 packs data from virtual output queues up to 1.5NR wide and transfers the data to the central memory 34. The speed-up of 1.5 implies that once one full memory cell has been transferred, to maintain required throughput, the second memory cell can be transferred if it is more than 75% full. Furthermore, once two memory cells have been transferred, the third memory cell can be transferred even if it has filled to only one byte. Thus the speed-up ensures that a packet longer than two memory cells is never delayed, small packets that are parts of a large burst are never delayed and, since selection of VOQ considers priorities, higher priorities are given the latency minimization benefit of the speed-up before the lower priorities.

Furthermore, if a low-priority and low-rate flow is traversing a network of these switches, a small packet (smaller than a memory cell) of the flow will experience a latency transiting the first switch where it will be packed with a trailing packet. Thereafter this burst of packets will transit rest of the switches on the path without experiencing a packing latency.

Figure 5:
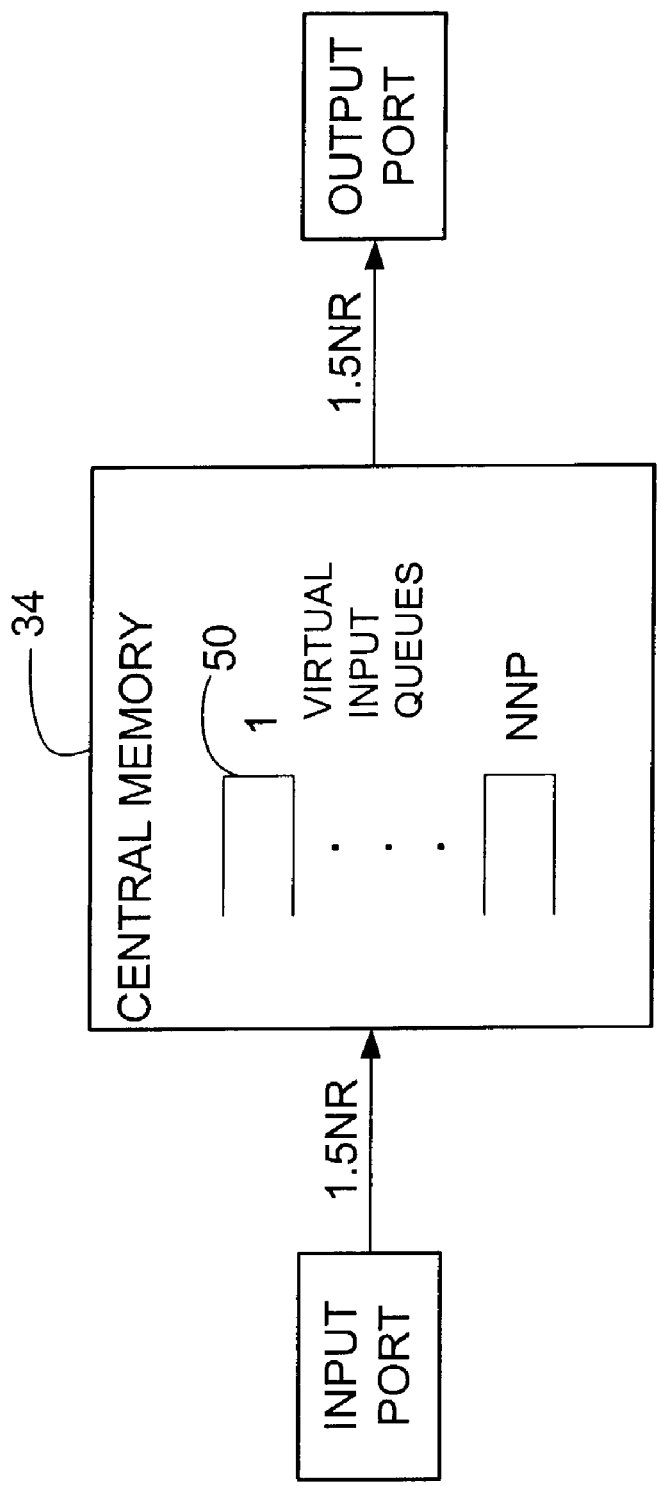
FIG. 5 is a diagram illustrating details of a centralized shared memory of the system of FIG. 3.

Details of the central memory architecture are shown in FIG. 5. Data transferred from the input buffers 30 to the central memory is TDM (time-division multiplexing) based (i.e., each input port is granted one transfer every N clock cycles) (FIGS. 3 and 5). TDM 33 is preferably performed on the data entering and exiting the shared memory 34. Each input is therefore statically allocated 1.5R bandwidth toward the central memory.

Data is transferred from central memory 34 to output ports 38 in the same manner. The central memory includes NNP virtual input queues 50 (i.e., NP virtual input queues for each output port). The central memory bus preferably has 1.5× speed up to deal with fragmentation in the transfer. The queues 50 are configured to allow more than one small-sized packet to be packed into a single central memory cell. All of the data memories are preferably 9 bits per byte. An EOP (End of Packet) control character separates adjacent packets. Alternatively, a descriptor may be associated or embedded with each memory word. The descriptor identifies start positions of packets in the word using either a bit mask or an offset from the word start.

When backlogged data in the central memory 34 for a particular output port 38 exceeds a certain threshold, backpressure messages are preferably sent to ingress line cards to prevent further transmitting of packets destined to that output port. Since each input port 30 is statically allocated a fixed amount of bandwidth toward the central memory 34, there is no fairness concern for the backpressure mechanism.

The size of shared memory is equal to the sum of $[N*(N-1)*Pmax/2+N*L*R]$ where Pmax=maximum packet size and L=backpressure latency. Thus, a switch with an amount of shared memory equal to above, VOQs in input buffers, VOQs in the shared memory fabric and per-VOQ backpressure has departure processes that are generally the same as those of a simple output queue switch. Hence this switch provides small latency and latency variation generally equal to that of an output queued switch.

For N=64 and Pmax=12 k bits, the first component of memory required above is equal to 24M bits, or, with the datapath sliced across four chips, 6M bits per chip. Using special link code control characters in the inter-packet-gap to communicate backpressure results in $L*R=2$ Pmax. Thus the second component of the memory required above is 0.75M bits total, or, with datapath sliced across four chips, 192 k bits per chip.

Figure 6:
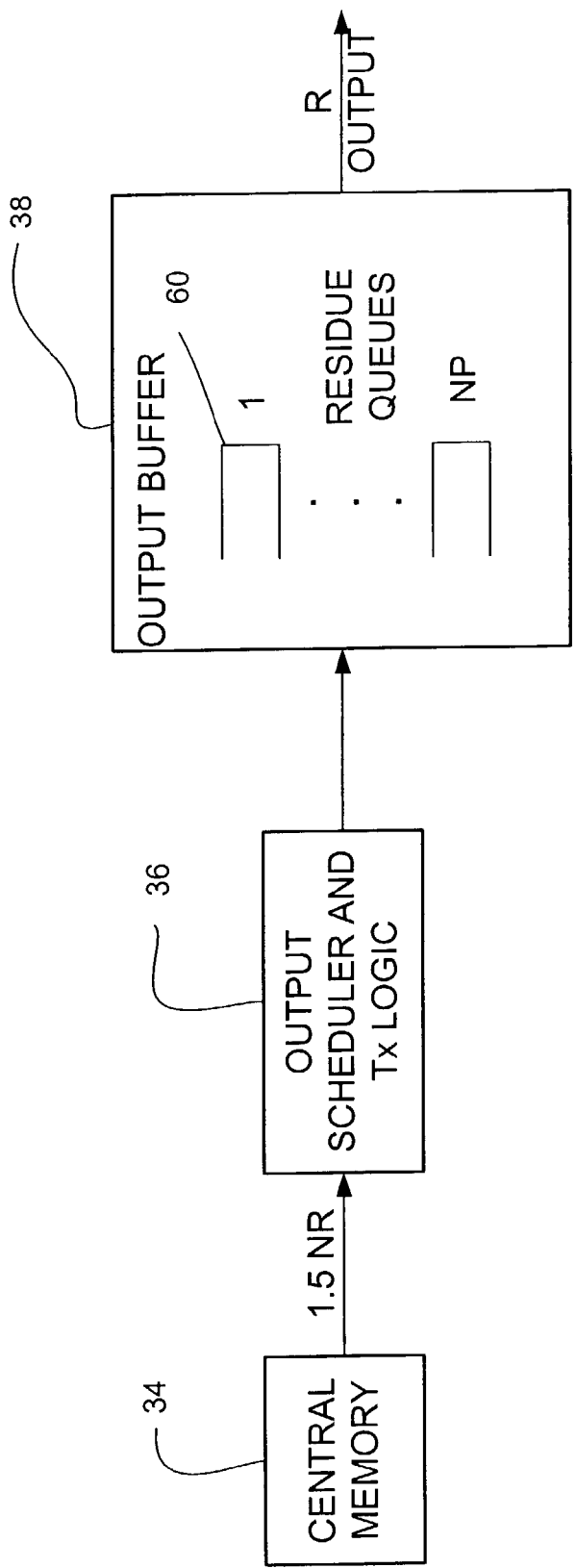
FIG. 6 is a diagram illustrating details of an output port and scheduler of the system of FIG. 3.

The output port scheduler 36 and output buffer 38 are shown in FIG. 6. The output scheduler 36 selects packets from its corresponding virtual input queues 50 in the central memory 34 and transmits them out to the appropriate output ports (FIGS. 5 and 6). Each output port has a dedicated output scheduler 36 (preferably completely independent from input schedulers 32). When packing data from a virtual output queue 34 into a central memory cell, a fraction of the data from the next packet in the virtual output queue is allowed in the cell (e.g., D4 in the shared memory 34 of FIG. 3). In other words, no packet boundary is required in the central memory cell. This fraction of data (D4) resides in the corresponding residue queue 60 in the output buffer 38 and waits for its entire packet (e.g., P4) to be transferred into central memory and ready for transmit from the appropriate output port. The residue queues 60 also function to unpack the data which was packed into a single buffer at the virtual output queues 40 of the input buffer 30.

In one embodiment, the system uses an ASIC chip (built, for example, using a CMOS 0.13 u process well known by those skilled in the art) which provides 640 Gb/s switching capability with four chips working in parallel (slicing) mode. In an alternate embodiment, the system provides an aggregate capacity of 160 Gb/s with one chip or 320 Gb/s in two chips.

Figure 7:
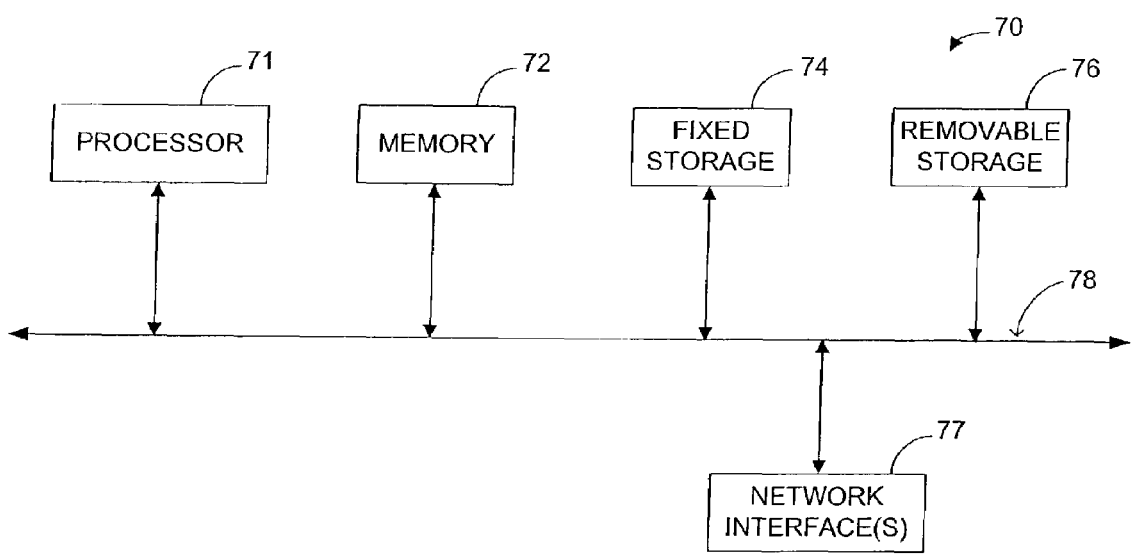
FIG. 7 is a block diagram of a computer system that can be utilized to execute software of an embodiment of the present invention.

FIG. 7 shows a system block diagram of computer system 70 that may be used to execute software of an embodiment of the invention. The computer system 70 includes memory 72 which can be utilized to store and retrieve software programs incorporating computer code that implements aspects of the invention, data for use with the invention, and the like. Exemplary computer readable storage media include CD-ROM, floppy disk, tape, flash memory, system memory, and hard drive. Computer system 70 further includes subsystems such as a central processor 71, fixed storage 74 (e.g., hard drive), removable storage 76 (e.g., CD-ROM drive), and one or more network interfaces 77. Other computer systems suitable for use with the invention may include additional or fewer subsystems. For example, computer system 70 may include more than one processor 71 (i.e., a multi-processor system) or a cache memory. The computer system 70 may also include a display, keyboard, and mouse (not shown) for use as a host.

The system bus architecture of computer system 70 is represented by arrows 78 in FIG. 7. However, these arrows are only illustrative of one possible interconnection scheme serving to link the subsystems. For example, a local bus may be utilized to connect the central processor 71 to the system memory 72. Computer system 70 shown in FIG. 7 is only one example of a computer system suitable for use with the invention. Other computer architectures having different configurations of subsystems may also be utilized. Communication between computers within the network is made possible with the use of communication protocols, which govern how computers exchange information over a network.

Figure 8:
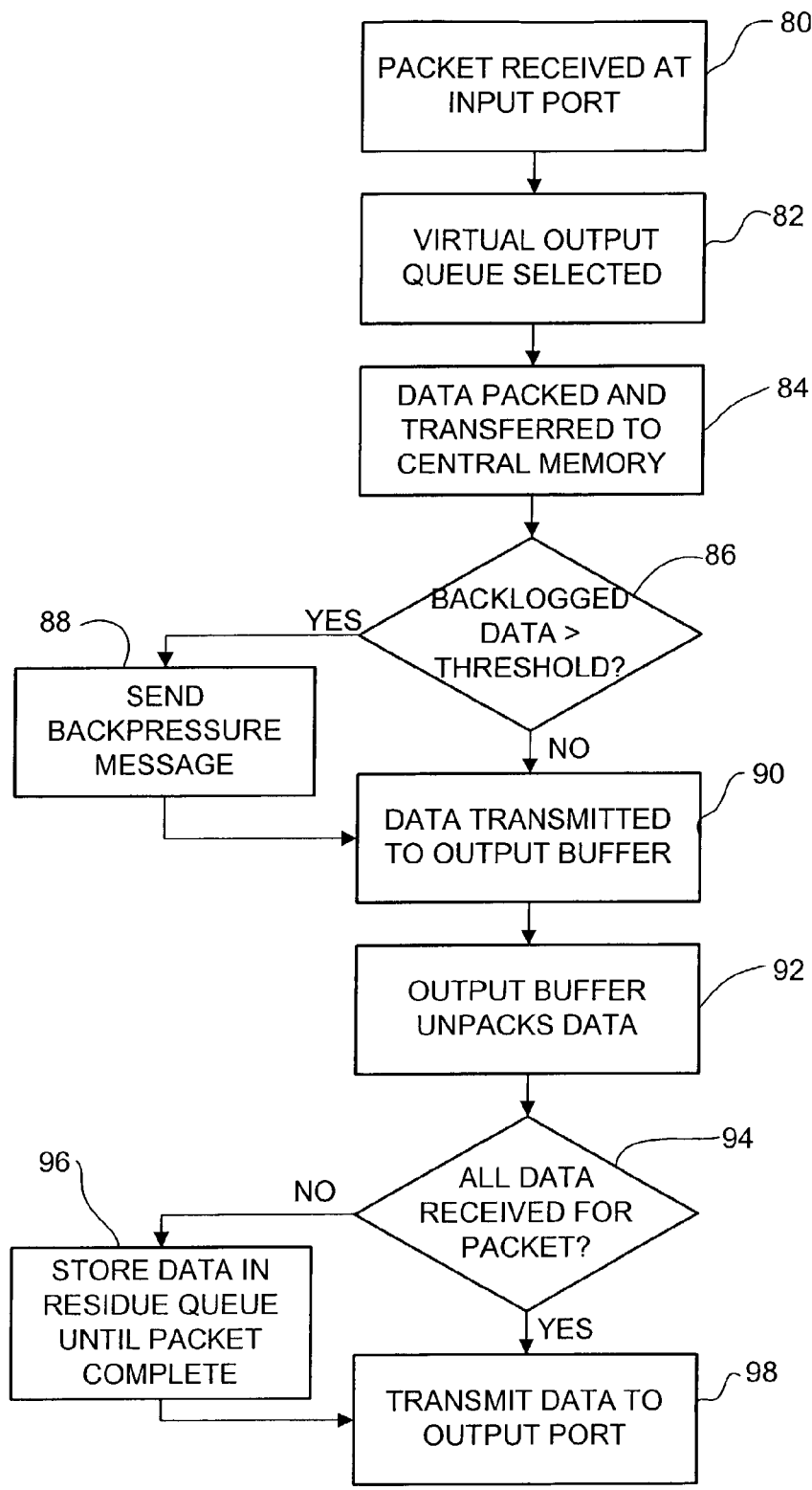
FIG. 8 is a flowchart illustrating a process for memory based switching.

FIG. 8 is a flowchart illustrating a process of the centralized memory based packet switching system described above. At step 80, packets are received at the input port. The input scheduler 32 selects a virtual output queue 40 for the data based on backlogged data length in the virtual output queues (step 82) and packs the data in the selected buffer along with other data already inserted into the buffer and not yet transferred to the central memory 34. The data is transferred from the input buffer to the central memory when selected for transfer by the input scheduler and staging logic 32 (step 84). If the backlogged data in the central memory for an output port exceeds a predetermined threshold, a backpressure message is sent to ingress line cards to prevent transmitting additional packets destined to the backlogged output port (steps 86 and 88). A packet is selected from the virtual input queue 50 in the central memory 34 and transmitted to the output buffer 38 (step 90). The output buffer 38 unpacks the received data at step 92. Residue data is stored in residue queue 60 until a complete packet is received (steps 94 and 96). Data is then transmitted to the output port at step 98.

As can be observed from the foregoing, the system and method provide numerous advantages. The centralized shared memory avoids the complexity and overhead cost (i.e., separate ASICs for slicing and reassembly functions) associated with the input-queued switch architecture. Since there is no centralized scheduler, as required by common input-queued switching, the scheduler design is simplified. Furthermore, since each output port has dedicated and independent output schedulers, more complicated QoS features can be implemented. The shared memory approach also allows for minimal buffering for output contention resolution while providing the advantages of output queues in shared memory. This is important since the amount of memory governs the power dissipation of the chip and minimizes the amount of data that may be lost when there is a fabric failover in systems with redundant fabrics.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A packet switching system having a plurality of input and output ports, the system comprising:
    an input buffer at each of the input ports;
    an input scheduler associated with each of the input buffers;
    a centralized memory shared by the output ports;
    an output buffer at each of the output ports; and
    an output scheduler associated with each of the output ports;
    wherein each of the input buffers comprises a plurality of virtual output queues configured to store a plurality of packets in a packed arrangement, said packed arrangement comprising data packed up to 1.5 times the number of virtual output queues times a data arrival rate at the input port.

2. The system of claim 1 wherein the centralized memory comprises at least one queue corresponding to each of the output ports.

3. The system of claim 1 wherein a control field separates adjacent packets.

4. The system of claim 1 wherein a descriptor is used to identify start and end positions of packets.

5. The system of claim 1 wherein the input scheduler is configured to select one of the virtual output queues to receive incoming data based on current data lengths in the virtual output queues.

6. The system of claim 1 wherein transfer of data from the input buffers to the centralized memory is TDM based.

7. The system of claim 1 wherein the centralized memory comprises a plurality of virtual input queues.

8. The system of claim 7 wherein the number of virtual input queues is at least equal to the number of input ports multiplied by the number of output ports.

9. The system of claim 1 wherein each of said plurality of output buffers comprises residue queues, wherein the residue queues are configured to store a portion of data from a packet until the remaining data is received.

10. The system of claim 1 further comprising a backpressure mechanism configured to transmit a message to an ingress line card if data in the centralized memory corresponding to one of the output ports exceeds a threshold level.

11. The system of claim 1 wherein the centralized memory is located on a single chip.

12. The system of claim 1 wherein the input scheduler and the output schedulers operate independent from one another.

13. The system of claim 1 wherein the number of output ports is equal to the number of input ports.

14. A method for memory based switching, comprising:
    receiving packets at an input buffer having a plurality of virtual output queues;
    selecting by an input scheduler, a virtual output queue for each of the packets based on backlogged data length in said plurality of virtual output queues;
    packing data from the selected virtual output queues up to 1.5 times the number of virtual output queues times a data arrival rate at the input buffer;
    transferring data from said virtual output queues to a centralized memory;
    selecting by an output scheduler, data to be transmitted to an output buffer; and
    transmitting one of the packets from the output buffer after all data corresponding to the packet is received.

15. The method of claim 14 further comprising sending a backlogged message if backlogged data in the centralized memory exceeds a predetermined threshold.

16. The method of claim 14 wherein transferring data in said virtual output queue to the centralized memory comprises transferring data from one of said input ports every clock cycle.

17. The method of claim 14 wherein transferring data to the centralized memory comprises packing a plurality of packets into a single cell of the centralized memory.

18. The method of claim 17 wherein transferring data comprises transferring a portion of a packet to the centralized memory.

19. A computer readable medium encoded with a computer program executable by a computer, the computer program comprising:
    code that receives packets at an input buffer having a plurality of virtual output queues;
    code that selects by an input scheduler, a virtual output queue for each of the packets based on backlogged data length in said plurality of virtual output queues;
    code that packs data from the selected virtual output queues up to 1.5 times the number of virtual output queues times a data arrival rate at the input buffer;
    code that transfers data in said virtual output queues to a centralized memory;
    code that selects by an output scheduler, data to be transmitted to an output buffer;
    code that transmits one of the packets from the output buffer after all data corresponding to the packet is received.

20. The computer program of claim 19 further comprising code that sends a backlogged message if backlogged data in the centralized memory exceeds a predetermined threshold.

21. The computer program of claim 19 wherein code that transfers data comprises code that transfers a portion of a packet to the centralized memory.

* * * * *